United States Patent Office 3,798,159
Patented Mar. 19, 1974

3,798,159
METHOD AND APPARATUS FOR CONTINUOUS FILTRATION OF LIQUIDS WITH SIMULTANEOUS REGENERATION OF FILTER MEDIUM
Laszlo Kisbocskoi, Budapest, Sandor Kubo, Tatabanya, and Gusztav Reczey, Budapest, Hungary, assignors to Tatabanyai Szenbanyak, Tatabanya, Hungary
Filed Feb. 23, 1972, Ser. No. 228,709
Claims priority, application Hungary, Feb. 23, 1971, TA–1,105
Int. Cl. B01d 15/06
U.S. Cl. 210—33
9 Claims

ABSTRACT OF THE DISCLOSURE

Liquids are continuously filtered through a portion of a filter medium such as sand with simultaneous regeneration of other portions of the filter medium. The raw liquid passes from a vertical distributor horizontally through a vertical filter bed in a single filter chamber while another portion of the filter bed in the same filter chamber is offstream. The offstream filter material is removed from the bottom and the material that has been filtered out is removed therefrom, whereupon the filter material is returned to the top of the single chamber, where it again fills the space from which it was removed. Separate filtrate collectors are provided which are selectively placed in communication with an outlet thereby to determine which portions of the body of filter material are onstream and which portions are offstream.

---

The present invention relates to the continuous filtration of liquids, with the simultaneous regeneration of the filter material.

It is known to provide for continuous filtration of a horizontally flowing liquid through a vertical filter bed. To this end, the filter bed continuously moves downwardly. However, the particle size of the filter material must in this case be larger than in the case of a stationary filter bed. Moreover, the flow rate of liquid through the downwardly moving filter material cannot be as high as through a stationary filter bed. Also, some of the liquid to be filtered is carried out with the downwardly flowing material.

It is also known to provide for filtration of the horizontally flowing liquid through a vertically disposed stationary filter bed. However, the filter bed must from time to time be placed offstream for regeneration by backwashing or the like. However, the intermittent operation thus required has proven to be highly disadvantageous.

Accordingly, it is an object of the present invention to provide methods and apparatus for the continuous filtration of liquids with simultaneous regeneration of the filter material, in which the advantages of stationary bed filtration will be enjoyed but without its corresponding disadvantages.

Another object of the present invention is the provision of methods and apparatus for a continuous filtration of liquids with continuous regeneration of the filter material, which will be relatively simple, inexpensive and reliable, and which will enable a high throughput with high recovery and good purity of the filtrate.

Figure 1:
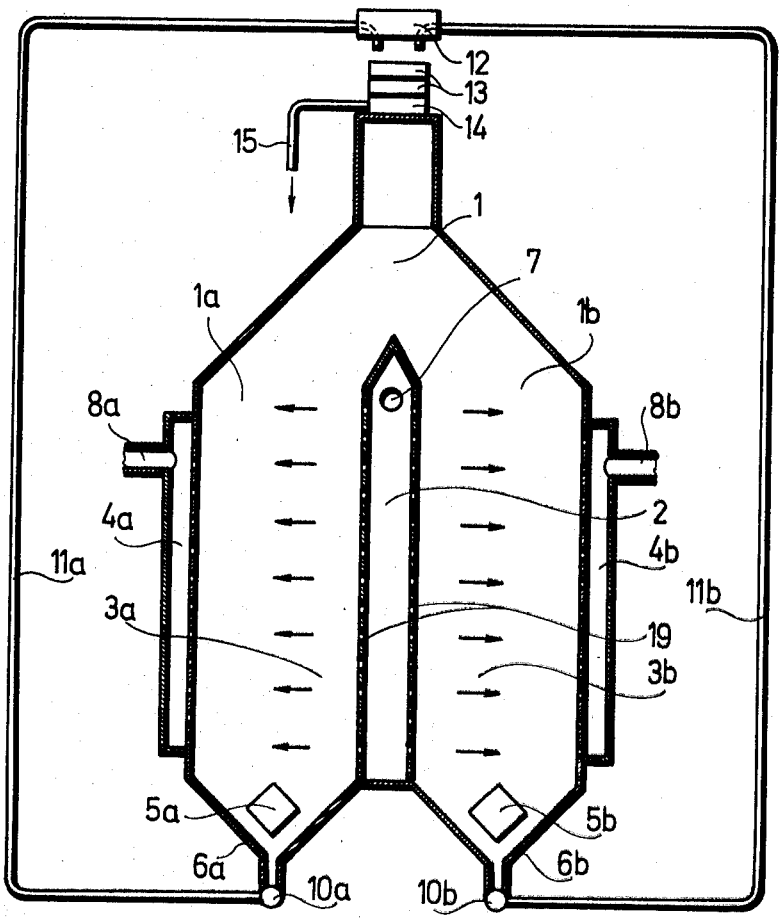
Figure 2:
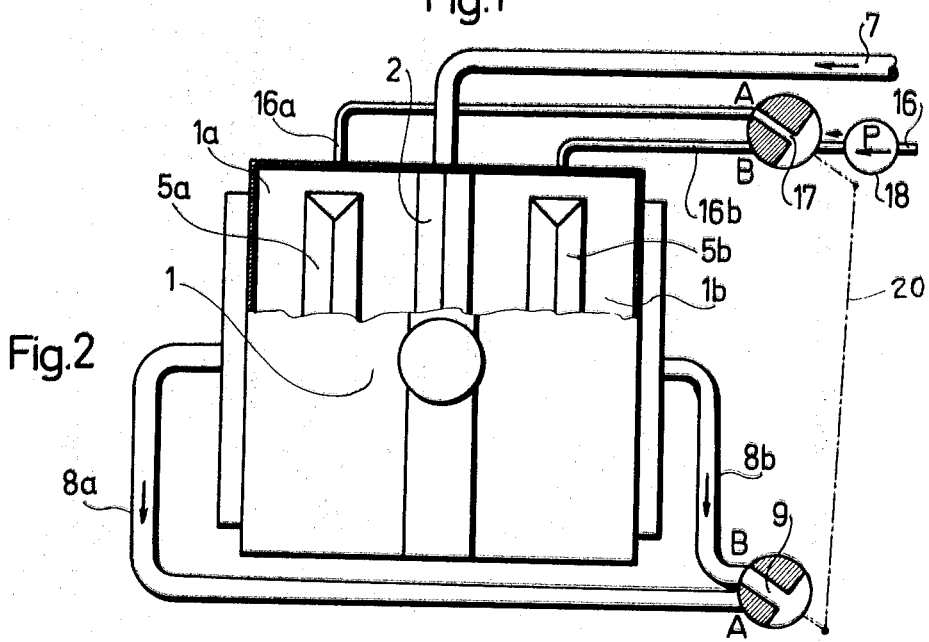

Other objects, features and advantages of the present invention will become apparent from a consideration of the following description, taken in connection with the accompanying drawing, in which:

FIG. 1 is a somewhat schematic side cross-sectional view of apparatus according to the present invention; and FIG. 2 is a somewhat schematic top plan view, with parts broken away, of the apparatus shown in FIG. 1.

Referring now to the drawing in greater detail, there is shown apparatus according to the present invention comprising a single filter chamber 1 having portions 1a and 1b on opposite sides thereof, the portions 1a and 1b embracing between them an upright liquid distributor 2. Granular filtering material 3a and 3b fills at least most of the volume of portions 1a and 1b, and may for example be sand. Each portion of the filter material is thus confined on one side by the multi-perforate vertical walls of distributor 2 and on the opposite side by the multi-perforate vertical walls of filtrate collectors 4a and 4b. The openings through the walls of distributor 2 and collectors 4a and 4b are shown at 19 in the form of small holes, but it will be understood that downwardly inclined louvers or other known constructions may be used.

At the bottom of the portions 1a and 1b of the filter chamber, prismatic inserts 5a and 5b are provided which cooperate with the inclined surfaces 6a and 6b of the lower ends of the portions 1a and 1b to ensure a steady and uniform downward movement of the filter material when the same is removed from the filter chamber for regeneration.

The raw liquid to be filtered is continuously introduced into distributor 2 through conduit 7. Filtrate from collectors 4a and 4b is removed through conduits 8a and 8b, respectively, which are connected to a two-position valve 9. When valve 9 is in position A (not shown), then filtrate will flow out only through conduit 8a; but when valve 9 is in the illustrated position B, then filtrate flows out only through conduit 8b. Thus, in the illustrated position of the structure, portion 1b of the filter chamber is onstream and portion 1a is offstream, because no liquid can flow horizontally from distributor 2 through portion 1a and through collector 4a to conduit 8a, conduit 8a being closed by valve 9.

At the lower or discharge ends of portions 1a and 1b, water jet pumps 10a and 10b are provided, respectively, for aiding in the discharge of particulate filter material from one or the other portion of the filter chamber. Filter material entrained in a stream of flowing liquid flows through conduits 11a and 11b to apparatus for removing filtrand from the filtered material, which may include structure for loosening the filtrand from the filter material, a vibrator and apparatus for separating the washing water and the filtrand from the regenerated filter material, this apparatus being shown at 12, 13 and 14, the wash water with separated contaminants leaving through conduit 15 and the regenerated filter material returning to filter chamber 1 by gravity from the apparatus 12, 13, 14.

Water to operate the water jet pumps 10a and 10b is supplied from a conduit 16 through a two-position valve 17 under the impetus of pump 18, and hence through the selected one of conduits 16a and 16b to the pump 10a or 10b to be operated. Valve 17 has two position A and B as shown in FIG. 2 and will be in position A when valve 9 is in position B, and vice versa. A mechanical linkage 20, which could also be pneumatic or hydraulic or electrical, ensures the conjoint operation of valves 9 and 17 in the manner described above.

In operation, liquid to be filtered is continuously supplied through pipe 7 to distributor 2, whence it proceeds horizontally through that portion 1a or 1b of the filter material whose corresponding conduit 8a or 8b is open through valve 9. At the same time, the pump 10b beneath the onstream portion of the filter material is not in operation, and so the onstream filter bed is stationary.

The other filter bed, however, will move downwardly because the corresponding pump 10a or 10b is in operation, thanks to the position of valve 17. The contaminated filter material is thus progressively withdrawn from the offstream portion of the filter chamber, regenerated and returned to the top of the single filter chamber 1. The onstream portion of that filter chamber will be mostly or even entirely full of stationary filter material; and so the returned regenerated filter material will find its way by gravity back to that portion of the chamber whence it came, until substantially all the filter material in the offstream portion of the filter bed has passed at least once through the regeneration apparatus. The associated pump 10a or 10b can then be stopped by stopping pump 18, it not being necessary to continue the regeneration if regeneration can be accomplished in a shorter period of time than the onstream period for the other portion of the filter chamber.

When the onstream filter bed is contaminated and it is desired to switch, then preliminarily liquid may be directed through the other or newly regenerated bed for a short time and recycled to the raw water inlet by appropriate means (not shown), so as to eliminate the initial turbidity of the filtrate through the part of the filter bed that is now to be placed onstream, e.g. until the newly onstream filter bed reaches equilibrium filtering conditions. Then the valves 9 and 17 can be switched to their other position and the regeneration conducted on the filter material in what was until then the onstream portion of the bed.

It will of course be understood that the mechanism at 12, 13 and 14 can have many forms, such as the form of a grain-size separator, a gravity separator such as a centrifuge or cyclone separator or a hydraulic classifier with vertical flow or backward flow or a bowl classifier, etc.

Similarly, the pumps 10a and 10b can, in addition to being water jet pumps, be mechanical pumps or conveyors or hydraulic or hydropneumatic or other types of pumps or conveyors.

It will further be understood that the number of portions into which the single filter chamber can be divided can be greater than two and that when the number is greater than two, more than one of the portions can be onstream at a time, or more than one can be offstream at a time.

It will also be understood that in addition to or in lieu of sand, the filter material itself can be any of a variety of particulate materials. It is preferred, however, that the particles be sufficiently uniform that substantially all of them sink in the liquid at a velocity within ±20% of the average velocity.

From a consideration of the foregoing disclosure, therefore, it will be evident that all of the initially recited objects of the present invention have been achieved.

Although the present invention has been described and illustrated in connection with a preferred embodiment, it is to be understood that modifications and variations may be resorted to without departing from the spirit of the invention, as those skilled in this art will readily understand. Such modifications and variations are considered to be within the purview and scope of the present invention as defined by the appended claims.

We claim:

1. A method for continuously filtering liquid, comprising establishing a single filter chamber having granular filter material therein, directing liquid horizontally through the filter material in a first portion only of said filter chamber and withdrawing filtrate from said first portion, simultaneously removing filter material from a second portion of said filter chamber from below thereby establishing a downward movement of filter material in said second portion, removing contaminants from said removed filter material outside said chamber, reintroducing the removed and decontaminated filter material into the top of said single chamber, thereafter discontinuing removal of filtrate from said first portion and discontinuing the removal of filter material from said second portion and then directing liquid to be filtered horizontally through said second portion and removing filtrate from said second portion while removing filter material from the bottom of said first portion and decontaminating and returning the last-named filter material to the top of said single chamber.

2. A method as claimed in claim 1, and introducing said liquid to be filtered into a central portion of said filter chamber and withdrawing filtrate from a first peripheral region of said filter chamber while said liquid moves through said first portion in a first horizontal direction, and while continuously introducing said liquid to be filtered into said central portion of said filter chamber directing said liquid horizontally in a second direction and removing filtrate from a second peripheral region of said filter chamber separate from said first peripheral region while said liquid moves through said second portion of said filter chamber.

3. Apparatus for the continuous filtration of liquids, comprising means defining a single filter chamber having an inlet at its top for regenerated filter material, means for introducing liquid to be filtered into said filter chamber and for directing said liquid selectively horizontally through the filter material in each of a plurality of portions of said filter chamber, means for selectively withdrawing filtrate from any of said portions of said filter chamber, a plurality of outlets for filter material at the bottom of said chamber, one for each of said portions of said filter chamber, means to remove filter material selectively through any of said outlets and for regenerating said filter material by removing contaminants therefrom while the filter material is outside said chamber and for returning said regenerated filter material to the top of said single chamber through said inlet.

4. Apparatus as claimed in claim 3, said means for directing liquid to be filtered comprising for each of said portions an upright multi-perforate wall, said means for removing filtrate comprising for each of said portions a multi-perforate wall on the opposite side of said portion from the first-mentioned multi-perforate wall.

5. Apparatus as claimed in claim 4, said introducing means comprising a central liquid distribution chamber bounded by a plurality of said multi-perforate walls, said portions of said single filter chamber being disposed on opposite sides of said liquid distribution chamber.

6. Apparatus as claimed in claim 5, and means continuously supplying water to be filtered to said distribution chamber.

7. Apparatus as claimed in claim 3, said removing means comprising pumps for removing said filter material in a stream of liquid, there being one said pump individual to the bottom of each said portion of said filter chamber.

8. Apparatus as claimed in claim 7, and valve means for simultaneously withdrawing filtrate from one said portion and supplying water to said pump of another said portion of said single filter chamber.

9. Apparatus as claimed in claim 3, said bottom of said chamber having inclined downwardly converging surfaces, and prismatic inserts spaced above said inclined surfaces to ensure a steady and uniform downward movement of the filter material when the filter material is removed from the filter chamber for regeneration.

References Cited

UNITED STATES PATENTS

| 3,638,794 | 2/1972 | Holzer | 210—264 X |
|---|---|---|---|
| 3,578,167 | 5/1971 | Clack et al. | 210—264 X |
| 3,296,775 | 1/1967 | Squires | 210—268 X |
| 1,620,431 | 3/1927 | Bramwell | 210—264 X |
| 3,667,604 | 6/1972 | Lagoatte | 210—189 X |

SAMIH N. ZAHARNA, Primary Examiner
R. H. SPITZER, Assistant Examiner

U.S. Cl. X.R.

210—189, 264, 268